US008804283B2

(12) United States Patent
Meloche et al.

(10) Patent No.: US 8,804,283 B2
(45) Date of Patent: Aug. 12, 2014

(54) CHAMFERED MAGNETIC WRITE POLE

(75) Inventors: Eric Roger Meloche, Burnsville, MN (US); Eric Linville, Shakopee, MN (US); Jianhua Xue, Maple Grove, MN (US); Chris Rea, Edina, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 166 days.

(21) Appl. No.: 13/166,471

(22) Filed: Jun. 22, 2011

(65) Prior Publication Data
US 2012/0327535 A1    Dec. 27, 2012

(51) Int. Cl.
*G11B 5/127*    (2006.01)
*H04R 31/00*    (2006.01)

(52) U.S. Cl.
USPC .............. 360/125.13; 360/125.15; 29/603.07; 29/603.12

(58) Field of Classification Search
USPC ........................... 360/125.13, 125.15, 125.03
See application file for complete search history.

(56) References Cited

U.S. PATENT DOCUMENTS

| 5,075,280 | A | | 12/1991 | Pisharody et al. |
| 5,267,112 | A | * | 11/1993 | Batra et al. ............... 360/125.42 |
| 6,504,675 | B1 | | 1/2003 | Shukh et al. |
| 6,940,690 | B2 | * | 9/2005 | Tomiyama et al. ....... 360/125.05 |
| 7,324,304 | B1 | | 1/2008 | Benakli et al. |
| 7,417,825 | B2 | * | 8/2008 | Sasaki et al. ............. 360/125.07 |
| 7,916,425 | B2 | * | 3/2011 | Sasaki et al. ............. 360/125.15 |
| 7,924,528 | B2 | * | 4/2011 | Sasaki et al. ............. 360/125.15 |
| 8,125,732 | B2 | * | 2/2012 | Bai et al. ................... 360/125.09 |
| 8,254,060 | B1 | * | 8/2012 | Shi et al. ..................... 360/125.1 |
| 8,310,786 | B2 | * | 11/2012 | de la Fuente et al. ...... 360/125.3 |
| 2004/0228033 | A1 | * | 11/2004 | Aoki et al. ..................... 360/126 |
| 2004/0233578 | A1 | | 11/2004 | Gao |
| 2006/0288565 | A1 | | 12/2006 | Le et al. |
| 2007/0188918 | A1 | * | 8/2007 | Im et al. ......................... 360/126 |
| 2007/0258167 | A1 | * | 11/2007 | Allen et al. .................... 360/126 |
| 2008/0316653 | A1 | * | 12/2008 | Sasaki et al. .................. 360/319 |
| 2010/0146773 | A1 | * | 6/2010 | Li et al. ....................... 29/603.07 |
| 2011/0222188 | A1 | * | 9/2011 | Etoh et al. ................ 360/123.12 |
| 2011/0279926 | A1 | * | 11/2011 | Si et al. .......................... 360/122 |

* cited by examiner

*Primary Examiner* — Julie Anne Watko
(74) *Attorney, Agent, or Firm* — Hall Estill Attorneys at Law

(57) ABSTRACT

A write pole can have a magnetically conductive pole tip has at least one corner. The at least one corner may be chamfered to limit magnetic saturation of the conductive pole tip. The conductive pole tip can have one or more beveled surface that has a chamfered corner which extends a predetermined distance along an edge of the write pole.

20 Claims, 4 Drawing Sheets

CHAMFERED MAGNETIC WRITE POLE

SUMMARY

Various embodiments of the present invention are generally directed to a magnetic storage device that is capable of enhanced magnetic recording.

In accordance with various embodiments, a write pole has a magnetically conductive pole tip has at least one corner. The at least one corner may be chamfered to limit magnetic saturation of the conductive pole tip. The conductive pole tip can have one or more beveled surface that has a chamfered corner which extends a predetermined distance along an edge of the write pole.

DETAILED DESCRIPTION

Magnetic recording elements are generally discussed in the present disclosure, which largely relates to magnetic write poles capable of enhancing write field strength and gradient in data transducing heads. As demand for higher data capacity in electronic devices increases, added emphasis is placed on the size of data written to a data storage media and the space between each bit of data. A higher data capacity often relies on fitting more data bits in a given area on a storage media. However, increased data density devices can encounter limited write field and field gradient when recording ever smaller bits to a data storage medium. Thus, improving efficiency of a data recording element plays an increasingly important role in electronic devices with higher data capacity.

Accordingly, various embodiments of the present invention may configure a magnetically conductive pole tip with a chamfered corner to limit the magnetic saturation of the pole tip and enhance data recording efficiency. In one such embodiment, a write pole has a beveled surface defined at least by top, write, and side surfaces. A corner and edge extending from the beveled surface may be formed by the intersection of two or more surfaces, such as the side and top surfaces.

The edge of the beveled surface may be continuously chamfered to enhance write field gradient and data bit writeability through an improved ability to program data bits in a dense data bit portions of a magnetic media. Such an ability to control the magnetic saturation of writing portions of a data storage device allows for improved write field gradient and higher linear data bit densities.

Figure 1:
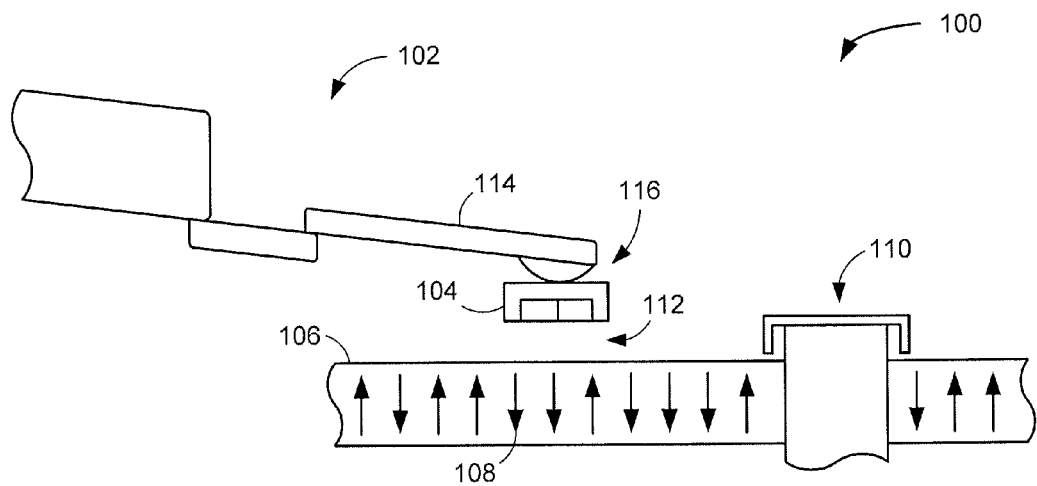
FIG. 1 is a block representation of an example portion of a data storage device.

An embodiment of a recording portion 100 of a data storage device is generally provided in FIG. 1. As shown, the recording portion 100 is present in a non-limiting environment in which various embodiments of the present invention can be practiced. The recording portion 100 has an actuating assembly 102 that positions a transducing head 104 over a magnetic storage media 106 that is capable of storing programmed bits 108.

In various embodiments, the storage media 106 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a predetermined portion of the media 106. The transducing head 104 can include one or more transducing elements, such as a magnetic writer and magnetically responsive reader, which operate to program and read data from the storage media 106, respectively. In this way, controlled motion of the actuating assembly 102 causes the transducers to align with tracks (not shown) defined on the storage media surfaces to write, read, and rewrite data.

Figure 2:
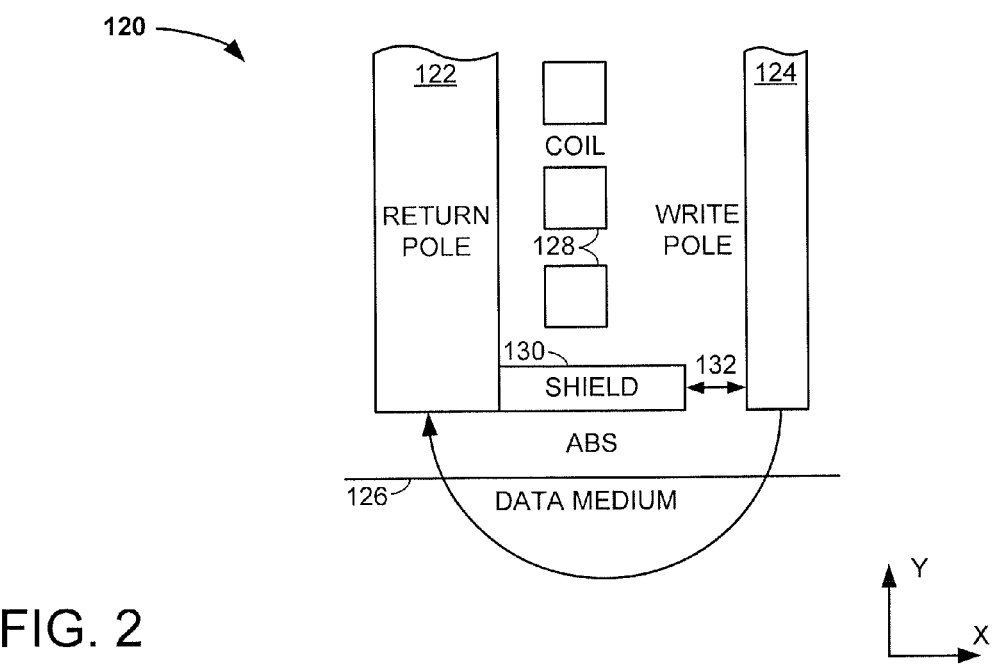
FIG. 2 is a block representation of a portion of a magnetic element capable of being used in the data storage device displayed in FIG. 1.

A representative view of an example of a recording portion 120 of a magnetic element is shown in FIG. 2. The recording portion 120 generally illustrates a return pole 122 and write pole 124 that operate to impart a magnetic flux onto a corresponding data medium 126. In operation, the return 122 and write 124 poles function with a conductive coil 128 to transfer magnetic fields to form a closed circuit. A front shield 130 is positioned between the return pole 122 and write pole 124 on the ABS and may reduce magnetic interference while focusing data recording to a predetermined portion of the data medium 126.

While the front shield 130 can be constructed in an unlimited variety of configurations, some embodiments position the shield 130 a predetermined gap length 132 from the write pole 124 to control the delivery of magnetic flux to the data medium 126. Various embodiments further configure the write pole 122, front shield 130, and gap length 132 to precisely tune and control flux delivery. One such geometry configuration can be the tapering of the write pole tip towards the ABS to tune magnetic flux delivery to the adjacent data medium 126.

Figure 3:
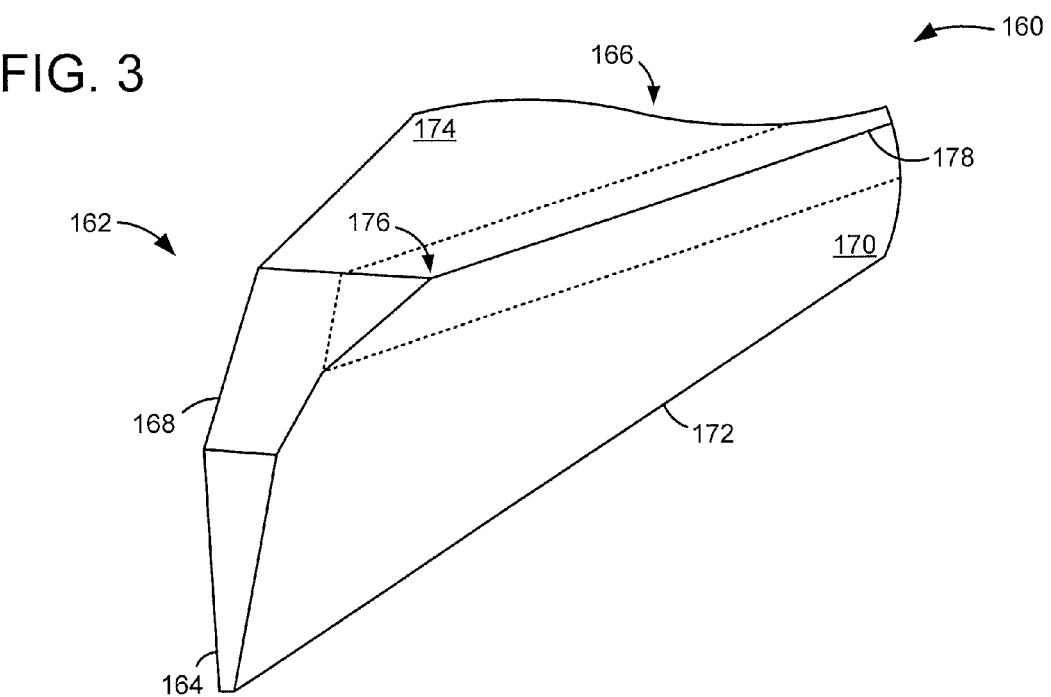
FIG. 3 shows a recording portion of an example magnetic element.

While write pole configurations are unlimited and not restricted to the substantially rectangular shape shown in FIG. 2, an example of a write pole 160 configured in accordance with various embodiments of the present invention is generally illustrated in FIG. 3. The write pole 160 is shown in a perspective isometric view that displays a variety of surfaces, edges, and corners that can be constructed as a write pole tip 162. It is to be understood that the pole tip 162 is merely illustrative of one of an unlimited number of pole tip configurations that vary in the number and orientation of the surfaces, edges, and corners.

One such pole tip surface can be a write surface 164 that continuously contacts the ABS during operation. In some embodiments, the write surface 164 is designed to be a predetermined shape, such as the trapezoid shown in FIG. 3, which has a surface area smaller than the body 166 of the write pole 160. That is, the pole tip 162 reduces in cross-sectional area from the body 166 via at least one bevel surface 168. The write surface 164 can further be defined by at least one side surface 170 and bottom surface 172. Meanwhile, the bevel surface 168 may be defined by the side surface 170 and a top surface 174 that forms a symmetric or asymmetric bevel surface shape with at least one corner 176 and edge 178 along the intersection of the top and side surfaces 174 and 170.

In operation, the bevel surface 168 and bottom surface 172 can each build magnetic concentration, such as when magnetic flux travels through the write pole 160 to the ABS. The accumulation of magnetic energy may degrade write pole 160 performance in the event the magnetic concentration inadvertently connects to adjacent components, such as a magnetic shield. Such loss of magnetic energy from the write pole 160 may inhibit write field gradient and strength as magnetic flux is diverted from the ABS and data recording operations.

Accordingly, portions of the write pole tip 162 can be chamfered, as shown by segmented lines, to control the build-up of magnetic energy in predetermined regions of the write pole 160. One such predetermined region may be the corner 176 of the bevel surface, as shown, that includes some or all of the edge 178. The chamfered removal of material from the write pole tip 162 and body 166 in the predetermined region can provide a chamfer surface, as displayed in FIG. 4, which has a greater surface area than the corner 176 and edge 178. The increase in surface area can produce a greater shape anisotropy that may magnetically saturate at a lesser rate than the corner 176 and edge 178. The material removal corresponding to the chamfer further can provide a reduction in the surface area of the bevel surface 168, which allows a more efficient magnetic flux pathway from the pole body 166 to the write surface 164 and adjacent data storage media.

Figure 4:
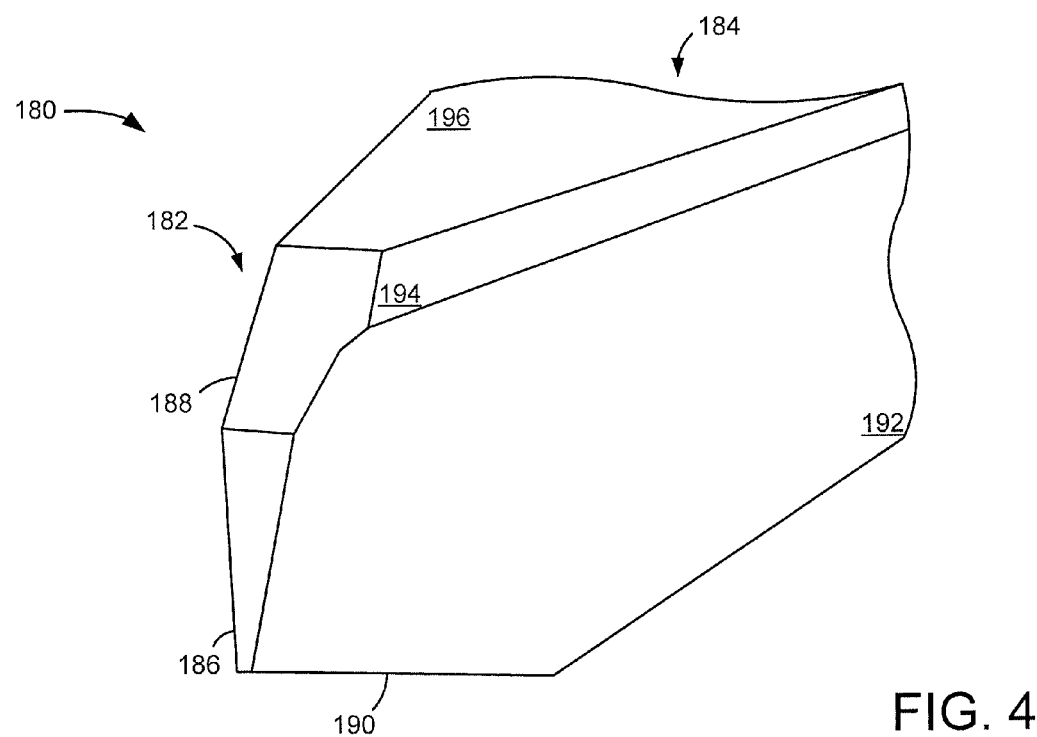
FIG. 4 displays a recording portion of an example magnetic element.

Turning to FIG. 4, a representative isometric view of an embodiment of another write pole 180 is displayed. The write pole 180 has a pole tip 182 that extends from a pole body 184 towards the ABS and has a write surface 186 configured to dispense magnetic flux to an adjacent data storage medium across the ABS. The pole tip 182 is shown with top and bottom bevel surfaces 188 and 190 that reduce the cross-sectional area of the pole body 184 to a predetermined write area at the write surface 186. While the top bevel surface 188 substantially faces the ABS, the bottom bevel surface 190 may merely be formed of the intersection between side surfaces 192 without providing a surface that faces the ABS.

One or more side surfaces 192 can be chamfered at least once to produce a chamfer surface 194 that transitions the side surface 194 to the top bevel and top surfaces 188 and 196. The chamfer surface 194 may be configured of a continuously angled uniform surface or as a series of two or more discontinuous surfaces formed with common or diverse angles with respect to the top 196, side 192, and bevel 188 surfaces. The ability to modify the configuration and placement of the chamfer surface 194 allows for precise tuning of the write pole 180 to conform to an unlimited number of structural and operational characteristics, such as large write field gradient.

Figure 5:
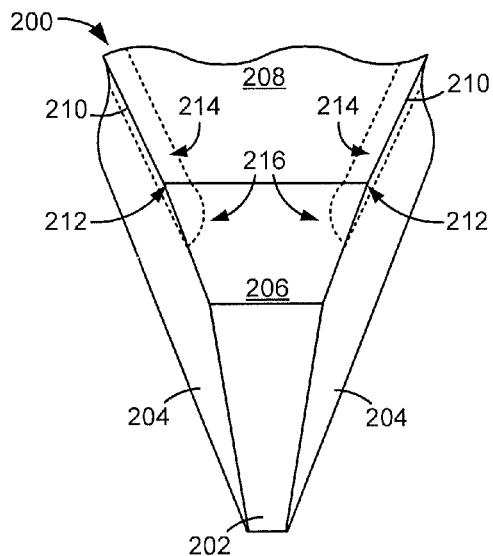
FIG. 5 is an example of an embodiment of a magnetic element as viewed from an air bearing surface (ABS).

FIG. 5 is a perspective view of an embodiment of a write pole 200, as viewed from the ABS. The write pole 200 has a write surface 202 that contacts the ABS and is defined by side 204 and bevel 206 surfaces. The bevel and side surfaces 206 and 204 can each connect to a top surface 208 to form edges 210 and corners 212. As shown, the write pole 200 embodiment of FIG. 5 has two chamfered regions 214, as illustrated by the segmented lines, which represent the removal of material from the pole 200 and the creation of at least one chamfer surface, similar to the chamfer surface 194 of FIG. 4.

While not limited to such a configuration, each chamfer region 214 can have matching angular orientations on opposite sides of the bevel surface 206 as well as continuously curvilinear profiles 216. Such curvilinear profiles 216 can produce a corresponding recessed chamfer surface that allows greater control of the magnetic energy concentration in the corners 212 and along the edges 210 of the write pole 200. However, each chamfer region 214 may be independently configured with or without curvilinear profiles 216, such as if one chamfer region 214 has a linear shaped profile while the opposite chamfer region 214 has a curvilinear shaped profile.

Figure 6:
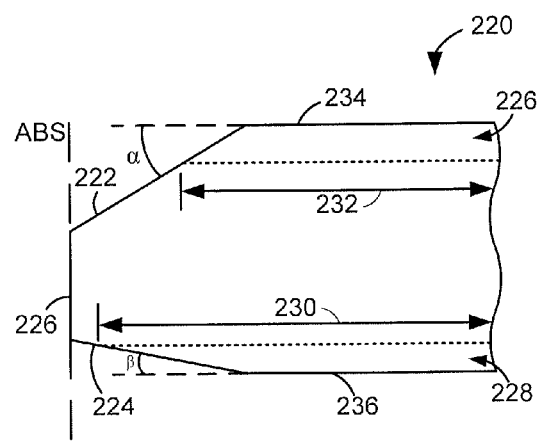
FIG. 6 provides a side view of an example magnetic element.

Similarly, more than one chamfer region 214 can be oriented at the top and bottom of the write pole 200. Such a configuration is shown in FIG. 6 as a side view of a portion of a write pole 220 with top and bottom bevel surfaces 222 and 224 that each has a respective angle $\alpha$ and $\beta$ that define the shape and size of the write surface 226. A portion of each bevel surface 222 and 224 is chamfered along different planes that are each orthogonal to the ABS to produce chamfer regions 226 and 228 that continuously extend away from the ABS.

The chamfer regions 226 and 228 can be configured with different lengths 230 and 232 that correspond with varying chamfer angles and amount of pole material being removed during chamfering. That is, a longer chamfer length may have a larger chamfer surface area due to the angle of the chamfer with respect to top and side surfaces of the write pole 220. In various other embodiments, the top and bottom chamfer regions 226 and 228 have matching or similar regions on opposite sides of the pole 220, which could provide four or more chamfer surfaces along the top 234 and bottom 236 surfaces of the pole 220.

Figure 7:
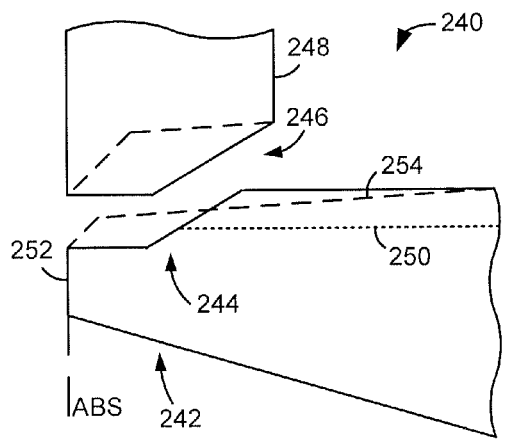
FIG. 7 illustrates a side view of an embodiment of a magnetic element.

In FIG. 7, a side view of another example of a write pole 240 is displayed according to various embodiments. The write pole 240 can have a tip region 242 that is configured with a tip feature 244 that corresponds to a shield feature 246 of an adjacent magnetic shield 248. The tip and shield features 244 and 246 can take an unlimited number of orientations and configurations that provide the ability to tune and control magnetic flux delivery from the pole tip region 242 to adjacent data storage media across the ABS.

Several examples of tip features are generally illustrated in FIG. 7, one such tip feature 244 is displayed by segmented line 250, which continuously angles from the pole body to the tip feature 244 of the pole tip 242. Another tip feature 244 configuration can be a recessed pole tip that forms a bevel angle from the write surface 252 to a top surface that is greater than 25 degrees. In yet another tip feature 244 configuration, a bevel surface is formed without forming recessed regions in the pole tip 242, as displayed by segmented line 254.

Regardless of the shape and orientation of the tip feature 244, the shield feature may be designed and constructed to form a predetermined gap distance, such as gap length 132 of FIG. 2, at the ABS. For example, the shield feature 246 may substantially match the configuration of the tip feature 244 at the ABS alone, or along the entire length of the pole tip 242 extending from the ABS. Conversely, the shield feature 246 may have a completely different size and shape while still providing a predetermined gap distance between the magnetic shield 248 and the pole tip 242. By adjusting the tip and shield features 244 and 246, magnetic operation of the write pole 240 can be tuned as portion of the shield 248 are positioned farther away from the pole 240 to reduce and eliminate inadvertent magnetic flux shunting from the pole tip 242 to the shield 248.

Magnetic shielding can be configured in a variety of unlimited manners to further control magnetic flux while providing efficient shielding. In one such configuration, a write pole assembly can have a write surface on the ABS that is disposed between magnetic side shields which are each shaped to face and be predetermined distances from side surfaces that each connect with the write surface. The side shields may be adjacent or extend to include a trailing shield 268 that faces the write surface and immediately adjacent bevel surface.

The bevel surface may have one or more chamfer surfaces that each has a corresponding trailing feature on the trailing shield. The trailing feature can take any form, such as a protrusion that may or may not match the chamfer surface size and shape. With the trailing feature, the trailing shield is tunable to provide enhanced shielding with greater control of magnetic flux shunting between the bevel surface and the trailing shield. It should be noted that the trailing shield moniker illustrates, merely for descriptive purposes, that the shield follows the path of the write surface and resides above various portions of an adjacent data storage medium after the write surface.

Figure 8:
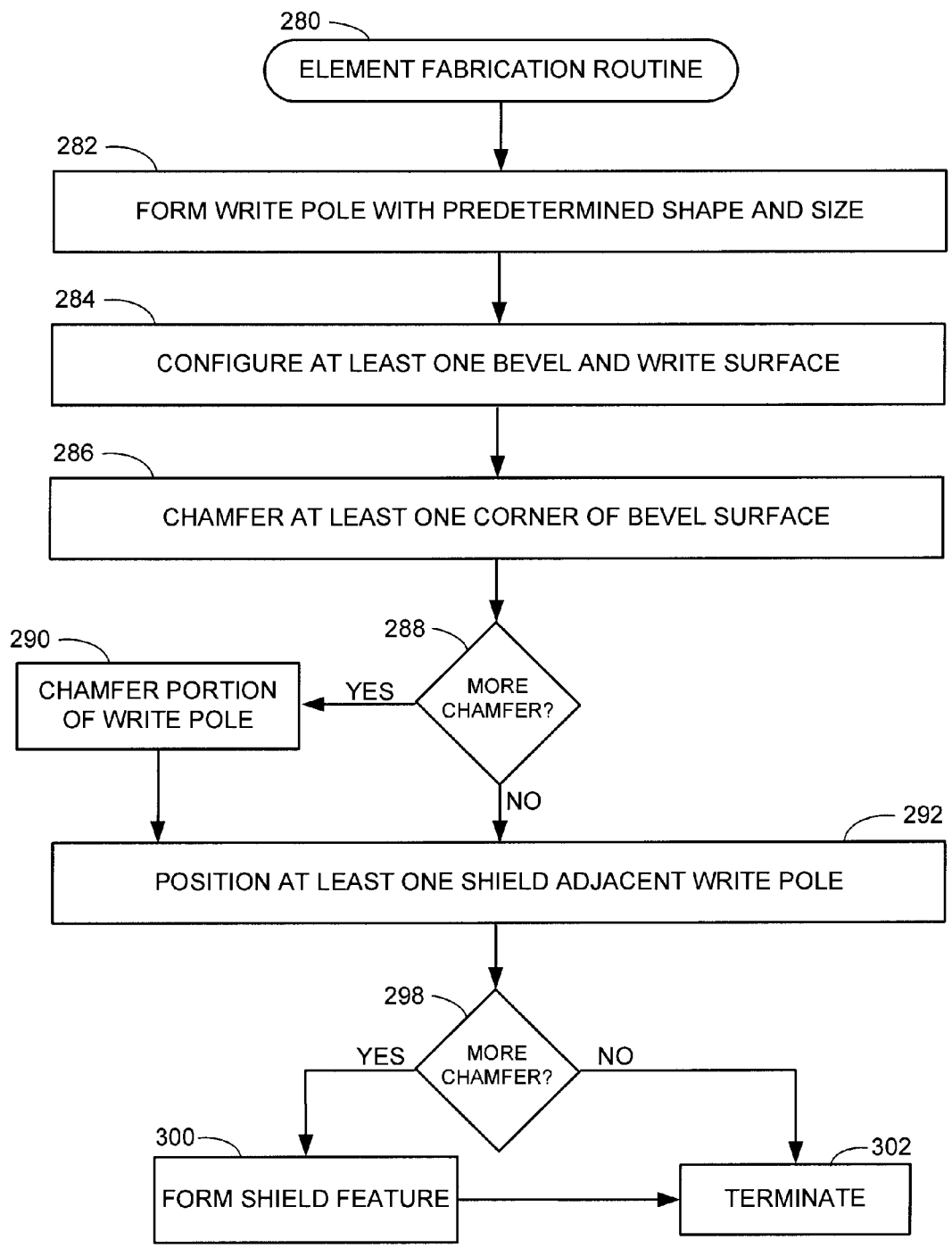
FIG. 8 provides a flowchart mapping an example of an element fabrication routine conducted in accordance with various embodiments of the present invention.

FIG. 8 provides a flowchart for an example pole fabrication routine 280 conducted in accordance with various embodiments. The routine 280 begins by forming a write pole with a predetermined shape and size in step 282. The write pole configuration is not limited and can be any shape and size, but in some embodiments, the pole is rectangular in shape with top and bottom surfaces are orthogonal to and are connected by a write surface.

Step 284 configures at least one bevel surface in the write pole. As discussed above, bevel surface(s) can have a variety of unique or common orientations positioned on the top and bottom of the write pole. With the bevel surface(s) in place, at least one corner of the bevel surface(s) is chamfered in step 286. Such chamfering can result in a continuous chamfer with a common angular orientation or a plurality of discontinuous chamfers with varying or common angles. Next, decision 288 determines how far the chamfered corner is to extend along the edge defined by the top and side surfaces of the write pole. If an extension from the ABS is chosen, step 290 advances the chamfer a predetermined distance along the edge in one or more material removal processes.

In the event no chamfered edge is chosen, the routine 280 proceeds to decision 292 where the installation of more chamfered surfaces is considered. Step 294 then removes other portions of the write pole with a chamfer in accordance with predetermined chamfer angle and length if decision 292 prescribes such activity. Regardless of the determination of decision 292, step 296 next positions at least one magnetic shield, such as a trailing and side shield, adjacent the write pole.

The positioning of the shield(s) in step 296 is followed by decision 298 in which shield features are evaluated. One choice proceeds to step 300 where one or more of the shields is manipulated to provide a feature of predetermined shape, size, and orientation to the write pole. Another choice is to terminate the routine 280 at step 302 either in lieu of or after constructing a shield feature.

Through the routine 280, a write pole assembly may be constructed that can be used as a magnetic recording element. However, the routine 280 is not required or limited to the steps and decisions shown in FIG. 9 as various decisions and steps can be omitted, changed, and added. For example, the construction of a bevel surface in step 284 can be omitted as an edge of the write pole is chamfered in step 286 without the presence of a bevel surface. In another example, the write pole can be constructed and chamfered without installation of any shields or shield features.

It can be appreciated that the configuration and material characteristics of the recording assembly described in the present disclosure allows for improved magnetic programming efficiency through enhancement of write field strength and gradient. The ability to tune and control magnetic saturation and write field performance of the write pole through a variety of different structural configurations allows for precise tailoring of magnetic recording performance, especially in high linear bit density recordings.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising a magnetically conductive pole tip comprising a write surface positioned on an air bearing surface (ABS) and a beveled surface connecting the write surface with a top surface extending orthogonal to the ABS, the bevel surface having at least one chamfered corner.

2. The apparatus of claim 1, wherein the beveled surface tapers away from the ABS to connect the write and top surfaces with a first side surface, the write surface positioned adjacent a data storage medium.

3. The apparatus of claim 2, wherein the at least one chamfered corner is positioned at an intersection of the beveled surface, first side surface, and top surface.

4. The apparatus of claim 2, wherein the beveled surface tapers the top surface to the write surface at a non-normal angle.

5. The apparatus of claim 2, wherein the at least one chamfered corner is positioned at an intersection of a bottom surface of the conductive pole tip and the first side surface, the bottom surface extending from the write surface.

6. The apparatus of claim 2, wherein the chamfered corner continuously extends along an edge of the conductive pole tip defined by the top and first side surfaces.

7. The apparatus of claim 2, wherein the write surface has a trapezoidal shape defined by the beveled surface, first and second side surfaces, and a bottom surface.

8. The apparatus of claim 1, wherein the conductive pole tip has two chamfered corners.

9. The apparatus of claim 1, wherein the conductive pole tip has a plurality of chamfered corners in an asymmetric configuration.

10. The apparatus of claim 9, wherein a trailing shield separated from the conductive pole tip by a trailing gap has an asymmetric configuration that substantially matches at least one chamfered corner of the conductive pole tip.

11. The apparatus of claim 1, wherein the at least one chamfered corner continuously extends a predetermined distance along a longitudinal plane of the conductive pole tip, the longitudinal plane being orthogonal to the ABS.

12. The apparatus of claim 1, wherein the at least one chamfered corner faces side and trailing shields each respectively adjacent and separated from the conductive pole tip.

13. The apparatus of claim 1, wherein the at least one chamfered corner has a curvilinear profile.

14. A method of making the apparatus of claim 1 comprising forming a magnetically conductive pole tip comprising a write surface positioned on an air bearing surface (ABS) and a beveled surface connecting the write surface with a top surface extending orthogonal to the ABS and chamfering at least one corner of the beveled surface of the conductive pole tip to limit magnetic saturation of the conductive pole tip.

15. The method of claim 14, wherein the at least one corner is continuously chamfered along a plane orthogonal to the ABS.

16. A magnetic writing element comprising a beveled surface of a magnetically conductive pole comprising a write surface positioned on an air bearing surface (ABS) and connected to a top surface extending orthogonal to the ABS and first and second side surfaces by a beveled surface, the beveled surface having a first corner and first edge formed by the intersection of the first side surface and the top surface, at least the first corner and edge continuously chamfered away from the ABS.

17. The magnetic writing element of claim 16, wherein a second corner and second edge are formed by the intersection of the write surface, first side surface, and a bottom surface of the conductive pole, the second corner and edge continuously chamfered.

18. The magnetic writing element of claim 17, wherein the chamfers of the first and second edges continuously and respectively extend along different first and second planes, each plane being orthogonal to the ABS.

19. The magnetic writing element of claim 16, wherein a second edge formed by the intersection of the top surface and a second side surface is chamfered to form a separate chamfer surface.

20. The magnetic writing element of claim 19, wherein each chamfer surface has a different angular orientation with respect to the write surface.

* * * * *